(12) United States Patent
Harms et al.

(10) Patent No.: US 10,246,190 B2
(45) Date of Patent: Apr. 2, 2019

(54) ADAPTIVE OPTICAL SENSOR FOR CONTAINER PRESENCE AND MOTION

(71) Applicant: GOODRICH CORPORATION, Charlotte, NC (US)

(72) Inventors: Scott Harms, Ypsilanti, ND (US); Justin D. Williams, Jamestown, ND (US)

(73) Assignee: GOODRICH CORPORATION, Charlotte, NC (US)

( * ) Notice: Subject to any disclaimer, the term of this patent is extended or adjusted under 35 U.S.C. 154(b) by 355 days.

(21) Appl. No.: 15/382,183

(22) Filed: Dec. 16, 2016

(65) Prior Publication Data
US 2018/0170545 A1    Jun. 21, 2018

(51) Int. Cl.
| | |
|---|---|
| *B64D 9/00* | (2006.01) |
| *B64C 1/22* | (2006.01) |
| *G01V 8/12* | (2006.01) |
| *H05B 37/02* | (2006.01) |
| *H05B 33/08* | (2006.01) |

(52) U.S. Cl.
CPC ............ *B64D 9/00* (2013.01); *B64C 1/22* (2013.01); *H05B 33/0845* (2013.01); *H05B 37/0209* (2013.01); *H05B 37/0218* (2013.01); *H05B 37/0227* (2013.01); *B64D 2009/006* (2013.01); *G01V 8/12* (2013.01); *Y02B 20/46* (2013.01)

(58) Field of Classification Search
CPC ...... B64D 9/00; B64D 2009/006; B64C 1/22; G01V 8/12; G01V 8/10; G01V 8/14; G01V 8/20; G01V 8/22; H05B 33/0845; H05B 33/0842; H05B 37/0209; H05B 37/0218; H05B 37/0227; H05B 37/02; Y02B 20/46
See application file for complete search history.

(56) References Cited

U.S. PATENT DOCUMENTS

| | | | | |
|---|---|---|---|---|
| 4,198,164 A | * | 4/1980 | Cantor | B61K 9/08 250/202 |
| 7,199,543 B1 | * | 4/2007 | Hettwer | B64D 9/00 198/781.01 |
| 8,768,608 B2 | * | 7/2014 | Scherenberger | G06Q 50/28 244/137.1 |
| 10,018,720 B1 | * | 7/2018 | Harms | B64C 1/20 |
| 2008/0078867 A1 | * | 4/2008 | Milender | B65G 13/065 244/118.1 |
| 2009/0121084 A1 | * | 5/2009 | Hettwer | B64D 9/00 244/137.1 |
| 2009/0121085 A1 | * | 5/2009 | Hettwer | B64D 9/00 244/137.1 |

(Continued)

Primary Examiner — John R Lee

(57) ABSTRACT

A power drive unit (PDU) includes a light source configured to generate light as pulses with pulse intervals between the pulses. The PDU also includes a light driver configured to control the light source to generate the light at a desired intensity. The PDU also includes a light receiver configured to receive a reflection of the light. The PDU also includes a processor coupled to the light receiver and configured to determine whether the cargo is positioned on the PDU based on the reflection of the light. The PDU also includes a light controller coupled to the processor and the light driver and configured to determine an adjustment to the desired intensity of the light generated by the light source based on an intensity of the reflection of the light and whether the light source is generating a pulse or a pulse interval.

20 Claims, 12 Drawing Sheets

(56) References Cited

U.S. PATENT DOCUMENTS

| | | | |
|---|---|---|---|
| 2012/0101636 A1* | 4/2012 | Huber | B64D 9/00 |
| | | | 700/275 |
| 2012/0206336 A1* | 8/2012 | Bruder | G01B 11/026 |
| | | | 345/156 |
| 2013/0100438 A1* | 4/2013 | Breuer | G01P 13/00 |
| | | | 356/51 |
| 2016/0171776 A1* | 6/2016 | Bridges | G01B 11/005 |
| | | | 348/47 |
| 2018/0170545 A1* | 6/2018 | Harms | B64C 1/22 |
| 2018/0172827 A1* | 6/2018 | Harms | B64C 1/20 |

* cited by examiner

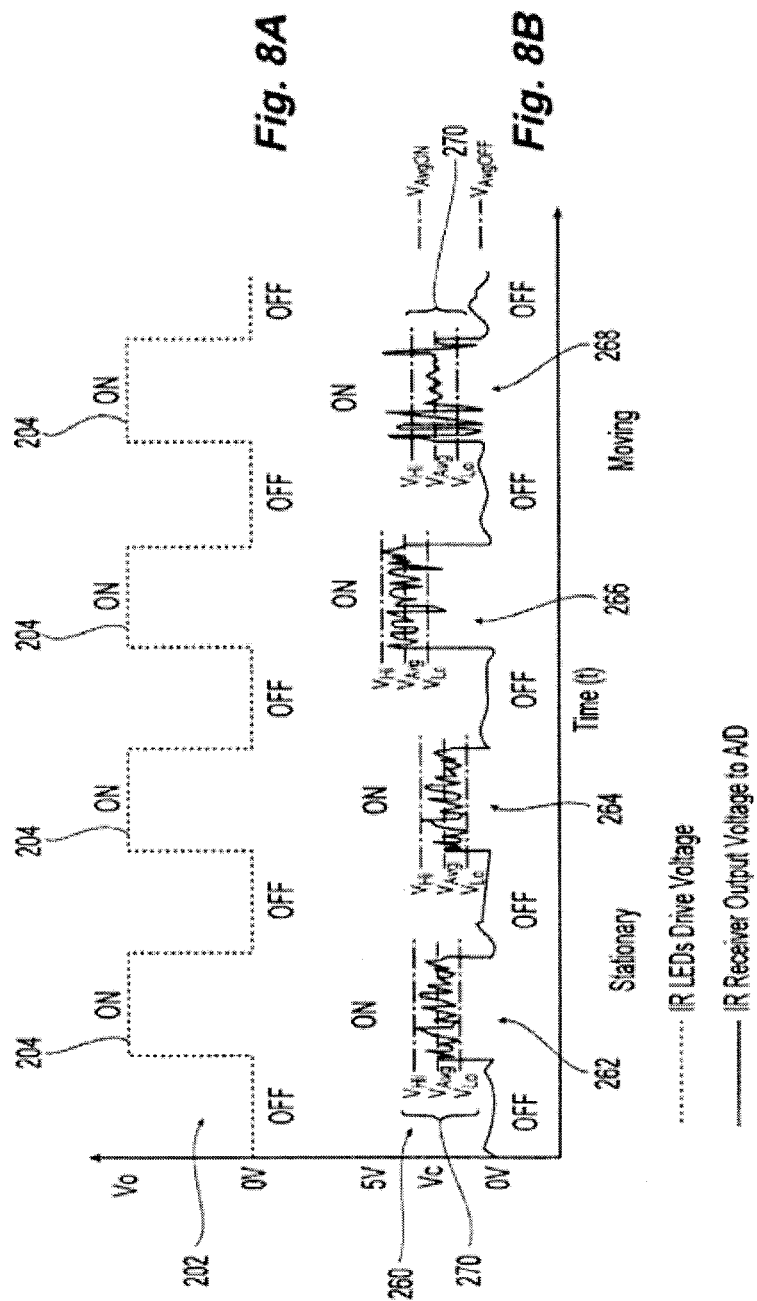

ADAPTIVE OPTICAL SENSOR FOR CONTAINER PRESENCE AND MOTION

FIELD

The present disclosure is directed to a power drive unit having the capability to detect the presence and motion of a cargo-carrying unit load device above the power drive unit.

BACKGROUND

A large variety of motorized systems for moving cargo are known. Motor driven rollers are typically employed in these systems. Aircraft often employ a series of motor driven power drive units ("PDU"s) to quickly and efficiently propel cargo containers and pallets, otherwise known as unit load devices ("ULD"s), within the aircraft cargo compartment. This configuration can allow for the transportation of cargo from an external loader to an interior of the aircraft by one or more operators controlling the PDUs.

It is desirable to track the location and movement of ULDs within the aircraft. Often times, PDUs may include sensors for detecting such location and movement. However, these sensors may become saturated or otherwise incorrectly detect location and movement of ULDs.

SUMMARY

Described herein is a power drive unit (PDU) for moving cargo within an aircraft. The PDU includes a light source configured to generate light as pulses with pulse intervals between the pulses. The PDU also includes a light driver configured to control the light source to generate the light at a desired intensity. The PDU also includes a light receiver configured to receive a reflection of the light. The PDU also includes a processor coupled to the light receiver and configured to determine whether the cargo is positioned on the PDU based on the reflection of the light. The PDU also includes a light controller coupled to the processor and the light driver and configured to determine an adjustment to the desired intensity of the light generated by the light source based on an intensity of the reflection of the light and whether the light source is generating a pulse or a pulse interval.

In any of the foregoing embodiments, the light controller includes a first switch configured to output the intensity of the reflection of the light in response to the light source generating the pulse and an average intensity of the reflection of the light detected during a previous pulse in response to the light source generating the pulse interval, and a second switch configured to output the average intensity of the reflection of the light detected during a previous pulse interval in response to the light source generating the pulse and the intensity of the reflection of the light in response to the light source generating the pulse interval.

In any of the foregoing embodiments, the light controller further includes a first averaging block coupled to the first switch and configured to determine the average intensity of the reflection of the light during the pulse or during the previous pulse, and a second averaging block coupled to the second switch and configured to determine and output the average intensity of the reflection of the light during the pulse interval or during the previous pulse interval.

In any of the foregoing embodiments, the light controller further includes a first summer coupled to the first averaging block and the second averaging block and configured to determine a delta corresponding to a first difference between the average intensity of the reflection of the light during the pulse or during the previous pulse and the average intensity of the reflection of the light during the pulse interval or during the previous pulse interval.

In any of the foregoing embodiments, the light controller further includes a first gain block configured to determine a delta reference by multiplying the desired intensity of the light generated by the light source by a proportional coefficient.

In any of the foregoing embodiments, the light controller further includes a second summer configured to receive the delta reference and the delta and to determine an error signal corresponding to a second difference between the delta reference and the delta.

In any of the foregoing embodiments, the light controller further includes a second gain block configured to determine the adjustment to the desired intensity of the light generated by the light source by multiplying the error signal by the proportional coefficient.

Also described is a cargo loading system for use in an aircraft. The cargo loading system includes a cargo deck configured to support cargo. The cargo loading system also includes a plurality of power drive units (PDUs) each coupled to the cargo deck. Each of the PDUs includes a light source configured to generate light as pulses with pulse intervals between the pulses. Each of the PDUs also includes a light driver configured to control the light source to generate the light at a desired intensity. Each of the PDUs also includes a light receiver configured to receive a reflection of the light. Each of the PDUs also includes a processor coupled to the light receiver and configured to determine whether the cargo is positioned on the PDU based on the reflection of the light. Each of the PDUs also includes a light controller coupled to the processor and the light driver and configured to determine an adjustment to the desired intensity of the light generated by the light source based on an intensity of the reflection of the light and whether the light source is generating a pulse or a pulse interval.

In any of the foregoing embodiments, the light controller includes a first switch configured to output the intensity of the reflection of the light in response to the light source generating the pulse and an average intensity of the reflection of the light detected during a previous pulse in response to the light source generating the pulse interval, and a second switch configured to output the average intensity of the reflection of the light detected during a previous pulse interval in response to the light source generating the pulse and the intensity of the reflection of the light in response to the light source generating the pulse interval.

In any of the foregoing embodiments, the light controller further includes a first averaging block coupled to the first switch and configured to determine the average intensity of the reflection of the light during the pulse or during the previous pulse, and a second averaging block coupled to the second switch and configured to determine the average intensity of the reflection of the light during the pulse interval or during the previous pulse interval.

In any of the foregoing embodiments, the light controller further includes a first summer coupled to the first averaging block and the second averaging block and configured to determine a delta corresponding to a first difference between the average intensity of the reflection of the light during the pulse or during the previous pulse and the average intensity of the reflection of the light during the pulse interval or during the previous pulse interval.

In any of the foregoing embodiments, the light controller further includes a first gain block configured to determine a delta reference by multiplying the desired intensity of the light generated by the light source by a proportional coefficient.

In any of the foregoing embodiments, the light controller further includes a second summer configured to receive the delta reference and the delta and to output an error signal corresponding to a second difference between the delta reference and the delta.

In any of the foregoing embodiments, the light controller further includes a second gain block configured to determine the adjustment to the desired intensity of the light generated by the light source by multiplying the error signal by the proportional coefficient.

Also described is a method for determining desired changes to an amount of light generated by a light source of a power drive unit (PDU). The method includes generating, by the light source, light as pulses with pulse intervals between the pulses. The method also includes controlling, by a light driver, the light source to generate the light at a desired intensity. The method also includes receiving, by a light receiver, a reflection of the light. The method also includes receiving, by a processor and from the light receiver, an intensity of the reflection of the light. The method also includes determining, by the processor, whether cargo is positioned on the PDU based on the intensity of the reflection of the light. The method also includes determining, by a light controller, an adjustment to the desired intensity of the light based on the intensity of the reflection of the light and whether the light source is generating a pulse or a pulse interval.

Any of the foregoing embodiments may also include outputting, by a first switch of the light controller, the intensity of the reflection of the light in response to the light source generating the pulse, outputting, by a second switch of the light controller, an average intensity of the reflection of the light detected during a previous pulse interval in response to the light source generating the pulse, outputting, by the first switch, the average intensity of the reflection of the light detected during a previous pulse in response to the light source generating the pulse interval, and outputting, by the second switch, the intensity of the reflection of the light in response to the light source generating the pulse interval.

Any of the foregoing embodiments may also include determining, by a first averaging block of the light controller, the average intensity of the reflection of the light during the pulse or during the previous pulse, and determining, by a second averaging block of the light controller, the average intensity of the reflection of the light during the pulse interval or during the previous pulse interval.

Any of the foregoing embodiments may also include determining, by a first summer of the light controller, a delta corresponding to a first difference between the average intensity of the reflection of the light during the pulse or during the previous pulse and the average intensity of the reflection of the light during the pulse interval or during the previous pulse interval.

Any of the foregoing embodiments may also include determining, by a first gain block of the light controller, a delta reference by multiplying the desired intensity of the light generated by the light source by a proportional coefficient.

Any of the foregoing embodiments may also include determining, by a second summer of the light controller, an error signal corresponding to a second difference between the delta reference and the delta, and determining, by a second gain block of the light controller, the adjustment to the desired intensity of the light generated by the light source by multiplying the error signal by the proportional coefficient.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

FIG. 8A illustrates an ideal waveform including a plurality of light pulses and a plurality of light intervals, in accordance with various embodiments;

FIG. 8B illustrates two received pulses representative of stationary cargo and two additional received pulses representative of moving cargo, in accordance with various embodiments;

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
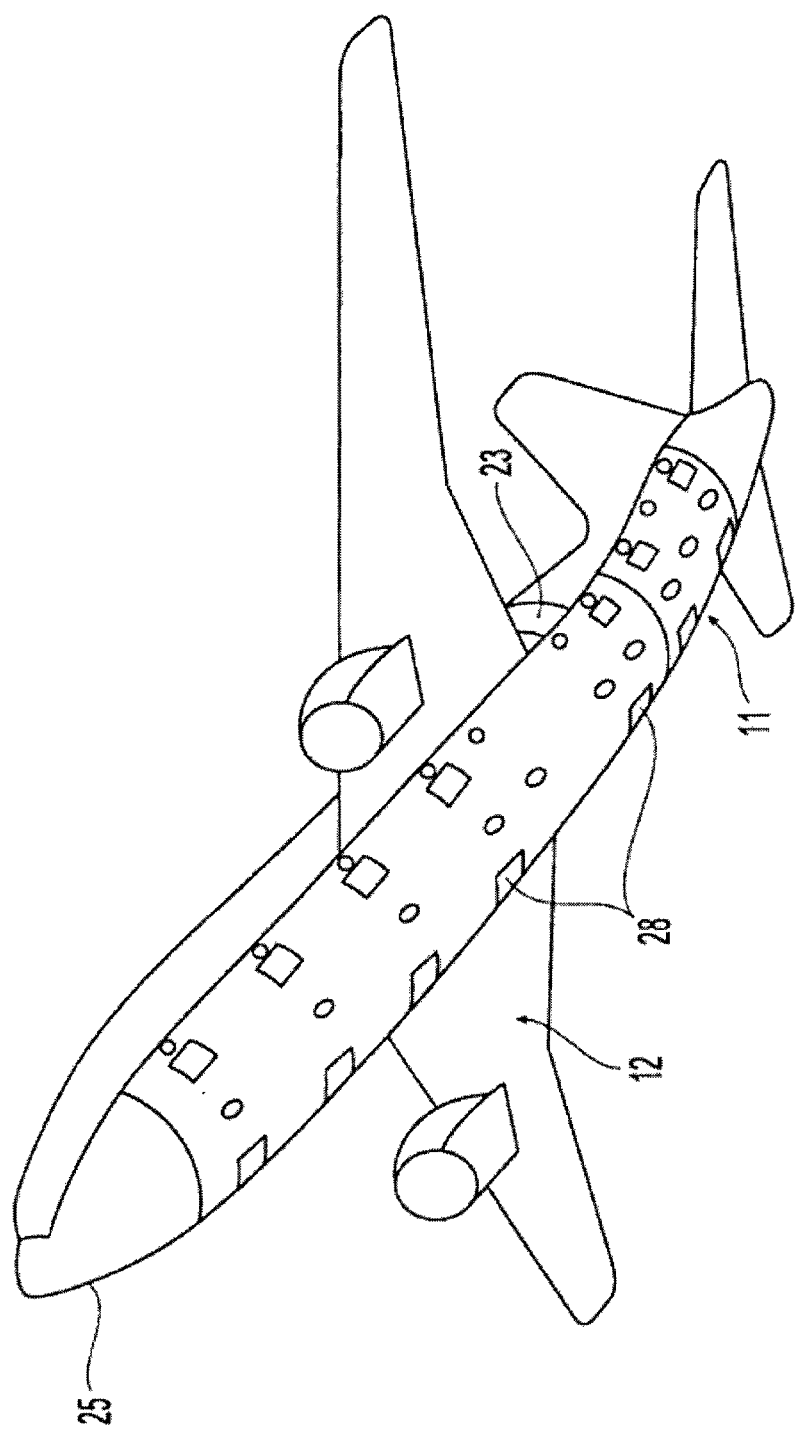
FIG. 1 illustrates an underside of an aircraft, in accordance with various embodiments.
Figure 2:
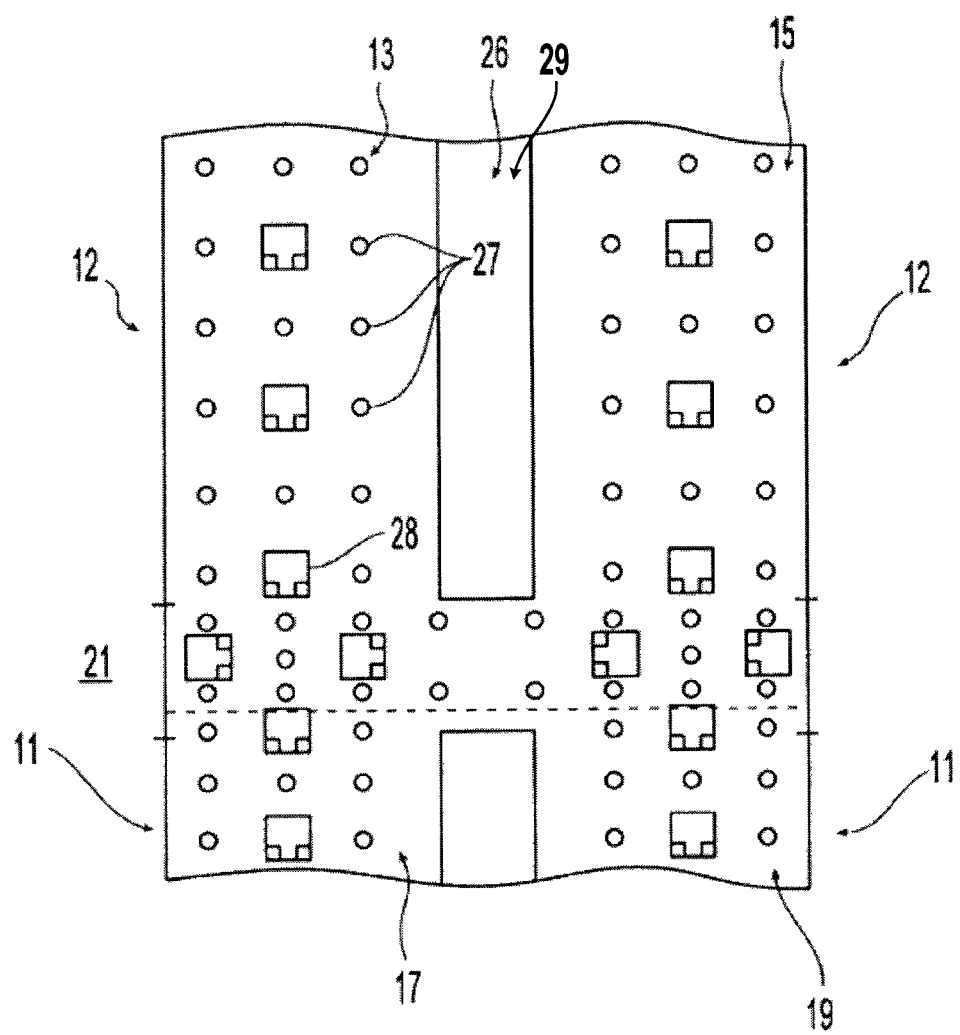
FIG. 2 illustrates an aircraft cargo deck, in accordance with various embodiments.

FIG. 1 illustrates an underside of an aircraft 25 and FIG. 2 illustrates an aircraft cargo deck 29 that can be used to implement various embodiments of the present disclosure. A generally H-shaped conveyance surface 26 forms a deck of an aircraft, adjacent a cargo bay loading door 23. However, there are many other aircraft cargo deck configurations to which the embodiments of the disclosure can be implemented. For example, various aircraft, particularly those configured primarily for the transportation of cargo without passengers, have the upper passenger deck removed and an additional larger cargo deck installed. Other aircraft may have three or more parallel longitudinal tracks rather than the H-shape shown in FIG. 2.

The cargo compartment includes a cargo loading system comprising a plurality of freely rotating conveyance rollers 27 mounted in the cargo deck to define the conveyance plane. Cargo loaded onto the aircraft cargo deck can be moved manually throughout the cargo bay upon the freely rotating conveyance rollers. However, it is desirable to electro-mechanically propel the cargo with minimal or no manual assistance. In that regard, the H-shaped cargo surface includes a number of PDUs 28 that provide a mechanism upon which cargo is propelled over the conveyance rollers 27. Each PDU 28 typically includes a drive roller element which can be raised from a lowered position beneath the cargo deck to an elevated position. These PDUs are referred to as "self-lift" PDUs. In the elevated position, the drive roller element contacts and drives the overlying cargo that rides on the conveyance rollers. Other types of PDUs, which can also be used as embodiments of the present disclosure, are above the conveyor plane all the time and held up by a spring. These PDUs are referred to as "spring-lift" PDUs.

In the longitudinal direction, the H-shaped conveyance surface 26 includes a left track and a right track along which cargo is to be stowed in parallel columns during flight. In the transverse direction, the cargo deck is also separated into a tail (or "aft") section 11 and a forward section 12. Thus, the left and right tracks are divided into four sections, two forward sections 13 and 15 and two aft sections 17 and 19. In addition to the four sections, there is an additional path 21 between both tracks at the cargo bay loading door 23. This additional path 21 divides the cargo bay between the forward section 12 and aft section 11. This path is used to move cargo into and out the aircraft, and also to transfer cargo between the left and right storage tracks.

In one embodiment, a human operator manipulates control elements to selectively and electrically energize PDUs 28 in each of the five aforementioned sections 13, 15, 17, 19 and 21. Typically, these controls are mounted in an operator interface unit. The control elements may be mounted on a wall or other structure within the cargo bay or may be portable, e.g., the controls may be in a hand held pendant. These controls will typically have an on/off switch and a joystick which, depending on the direction pushed, will energize a set of PDUs 28, causing groups of drive roller elements to be elevated (if not already elevated) and rotated in one of two possible directions (i.e., forward or reverse). A section of PDUs will remain energized as long as the joystick is held in a corresponding position. In response to release of the joystick, the selected set of PDUs is de-energized. In the case of self-lifting PDUs, the drive roller elements are returned to their retracted position below the plane of the conveyance rollers 27; in the case of spring-lift PDUs, the PDUs remain biased in the upward position and brakes are applied to hold the cargo containers in place.

Figure 3:
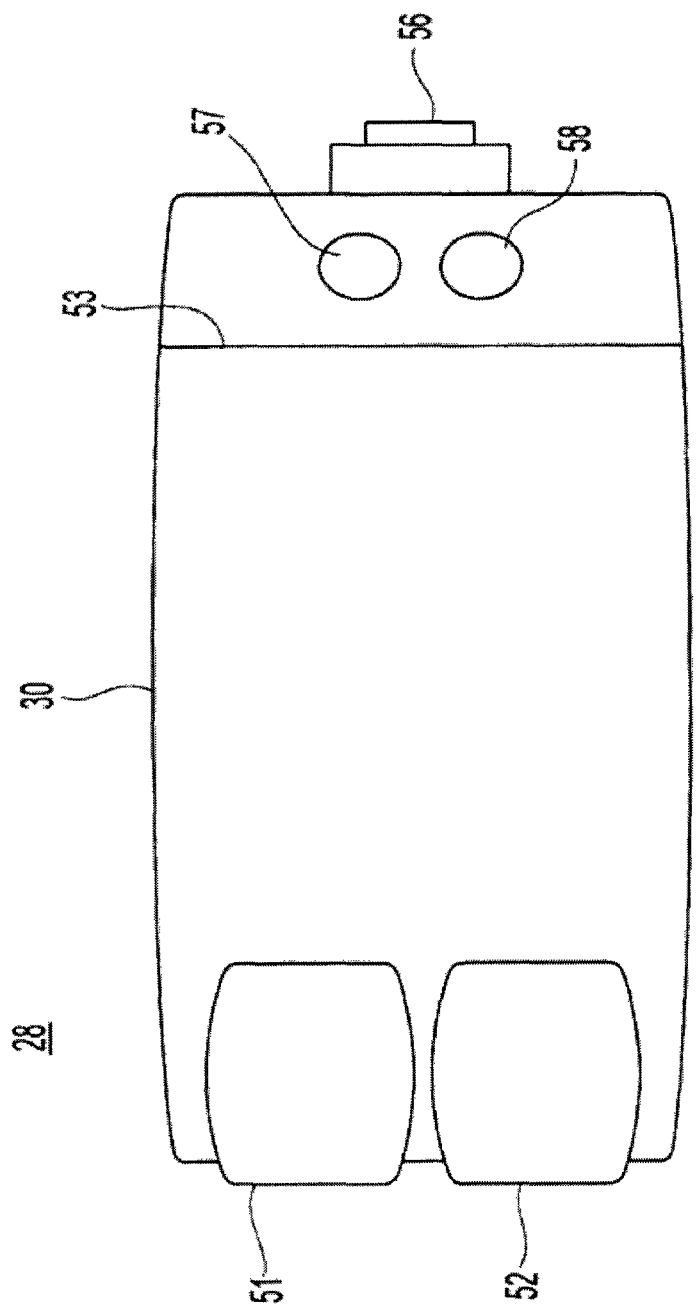
FIG. 3 is a top view of a PDU, in accordance with various embodiments.

FIG. 3 is a top view of a PDU 28 in accordance with various embodiments of the present disclosure. PDU 28 includes a housing 30 which incorporates a pair of wheels 51 and 52 that function as drive roller elements. Wheels 51 and 52 are coupled to a drive shaft. PDU 28 further includes motor and gear assemblies and other related components for turning and/or raising wheels 51 and 52 so that wheels 51 and 52 are positioned above the cargo deck and are able to contact the bottom of a ULD.

PDU 28 further includes an electronics cavity that is separated from the rest of the PDU by a wall 53 for housing the necessary electronics (disclosed in more detail below), and includes an electrical connector 56 for coupling the electronics to a power source and a control source.

PDU 28 further includes a light source 57, such as an infrared light ("IR") transmitter having a light emitting diode ("LED"), for emitting infrared light. PDU 28 further includes a light receiver 58, such as an IR receiver having a photo diode or photo transistor and perhaps other circuitry such as signal amplifiers, automatic gain control, bandpass filters and the like, for detecting the presence of infrared light. In further embodiments, other types of light besides IR can be used. It is understood by those having ordinary skill in the art that in response to the light source 57 emitting light of a particular center wavelength (e.g., infrared), the light receiver 58 may be selected based on its response characteristics in the relevant wavelength, and may be accompanied by appropriate optical filters, lenses and the like.

Figure 4:
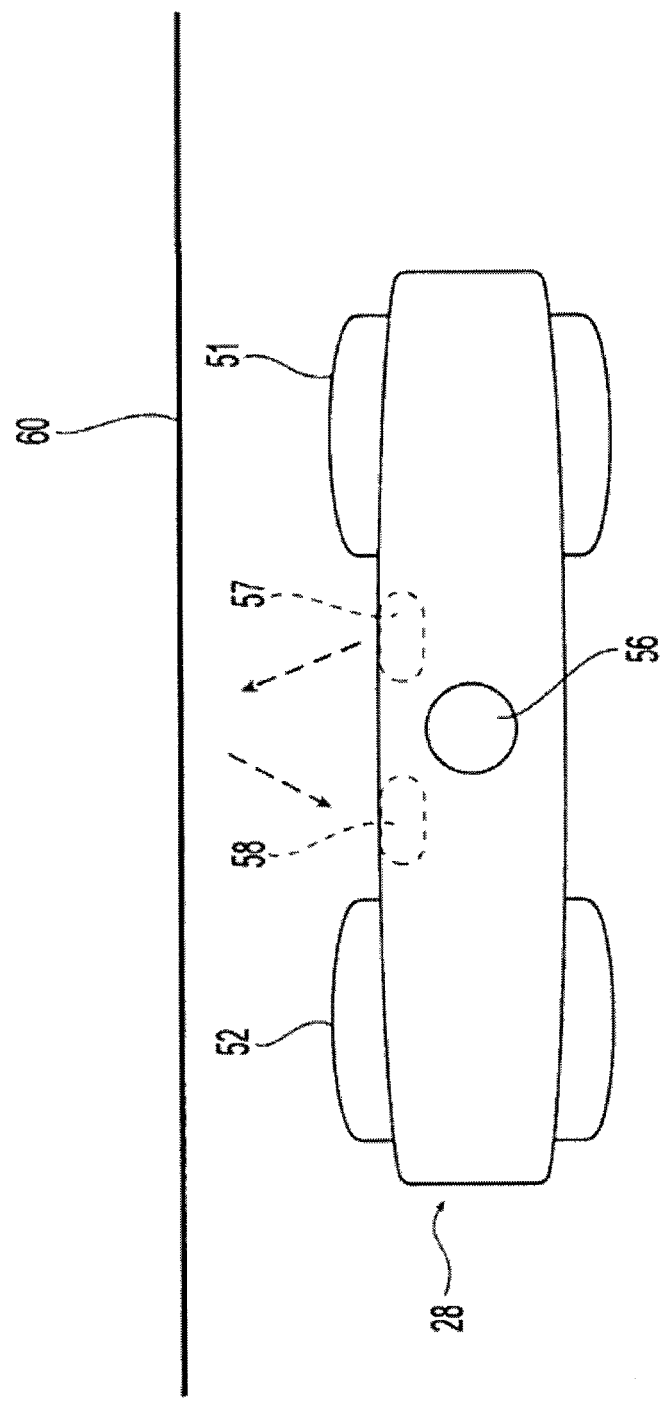
FIG. 4 is an end view of the PDU, in accordance with various embodiments.

FIG. 4 is an end view of PDU 28 in accordance with one embodiment of the present disclosure, and illustrates the relationship of PDU 28 with the bottom surface 60 of a ULD that is passing over and being propelled by PDU 28. The light source 57 emits light that bounces off the bottom surface 60 (assuming a ULD is present) and is reflected back to light receiver 58 where it is processed by the electronics of PDU 28.

Figure 5:
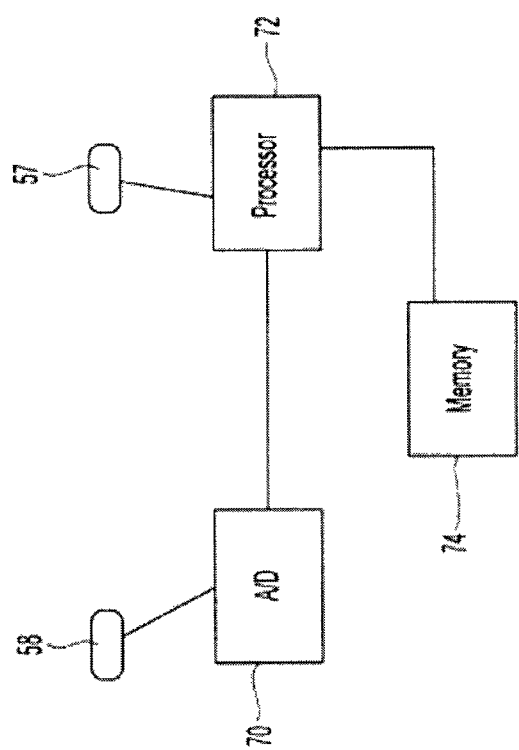
FIG. 5 is a block diagram illustrating components of the PDU of FIG. 3, in accordance with various embodiments.

FIG. 5 is a block diagram of the ULD sensor and scrub sensor electronics of PDU 28 in accordance with one embodiment of the present disclosure. Coupled to light receiver 58 is an analog to digital ("A/D") converter 70 that takes an analog input from the light receiver 58 and converts it to a digital value representative of an instantaneous intensity of light. Coupled to A/D converter 70 is a processor 72 and memory 74. Processor 72 may be, for example, a computer based-system having a processor aid memory. A processor may thus include one or more processors and one or more tangible, non-transitory memories and be capable of implementing logic. The processor can be a general purpose processor, a digital signal processor (DSP), an application specific integrated circuit (ASIC), a field programmable gate array (FPGA), a graphical processing unit (GPU), or other programmable logic device, discrete gate or transistor logic, discrete hardware components, or any combination thereof. Memory 74 may be any non-transitory memory capable of storing data. For example, memory 74 may store instructions to be executed by processor 72. In various embodiments, processor 72 may include A/D converter 70 and/or memory 74. Light source 57 is coupled to an output of processor 72. In various embodiments, a power driver is included between processor 72 and the light source 57.

A processor-adjustable variable resistor may be coupled to processor 72 and light receiver 58. The variable resistor is used to set the sensitivity of A/D converter 70, which selects the window of light that the sensor will measure (i.e., the minimum strength of light that will be detected and the greatest strength of light that can be measured before the A/D output reaches its maximum value).

In various embodiments, the A/D converter 70 is a 10-bit A/D converter, although A/D converters of other bit resolutions may be used instead. In various embodiments, the A/D converter 70 samples the time-varying light intensity at a rate of 200 samples/second, or at 5 millisecond intervals. Thus, for a one-quarter second pulse, a time series of 50 digital samples are taken, and these are provided to the processor 72 for further calculations. It is understood that not all 50 samples may be used due to start-up transients in the first few digital samples. It is further understood that other sampling rates may be used, depending on the A/D converter 70 and processor 72 speed.

Figures 6A, 6B:
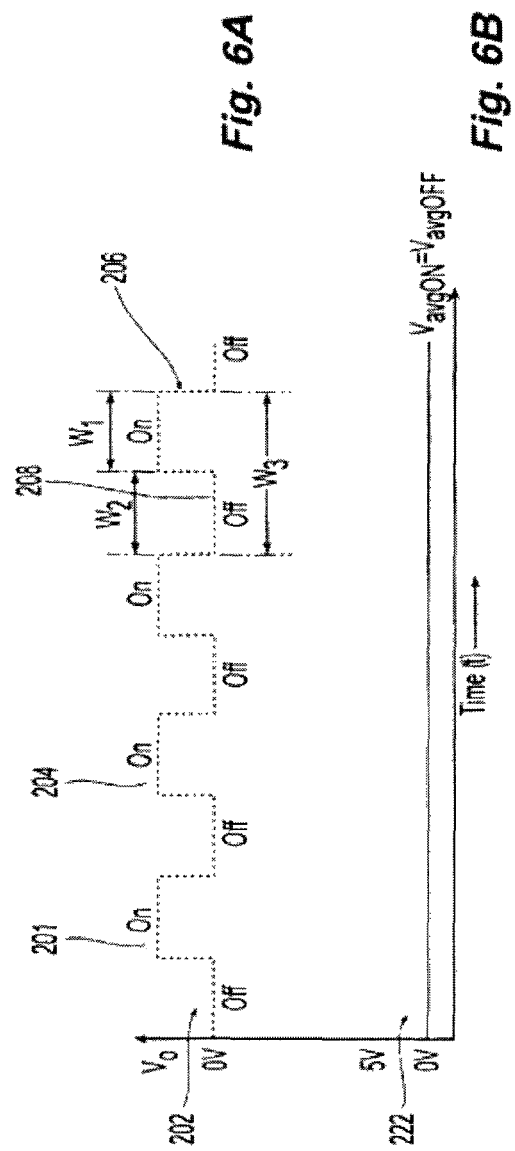
FIG. 6A illustrates an ideal waveform comprising a plurality of light pulses and a plurality of light intervals, in accordance with various embodiments.
FIG. 6B illustrates an ideal output in response to a lack of cargo on the PDU of FIG. 3, in accordance with various embodiments.

FIG. 6A shows an example of an ideal output waveform 202 emitted by the light source 57. The output waveform 202 comprises a train of light pulses 204 with a nominal pulse height represented by a voltage $V_0$. In the embodiment shown, these pulses comprise square waves with an ON period 206 of W1, an OFF period 208 of W2, and a total period of W3=W1+W2. In a particularly preferred embodiment W1=W2 for a 50% ON-time duty cycle, though it is possible to have other duty cycles, as well.

FIG. 6B shows an ideal waveform 222 output by the light receiver 58 (i.e., the received light) in response to no ULD covering the PDU. In the absence of an object, e.g., an ULD, covering the PDU 28, the emitted light pulses 240 are not reflected off of the bottom surface of that object, and so no light energy (i.e., 0 volts) should be received at the light receiver 58, whose output is therefore flat. In reality, however, there may be a small amount of ambient light of the appropriate wavelength, such as 'bleed' from the light source 57, that impinges on the light receiver 58, thus resulting in minimal received light energy. However, this minimal received light energy is generally below a threshold value and therefore is ignored by the processor 72.

Figure 7A:
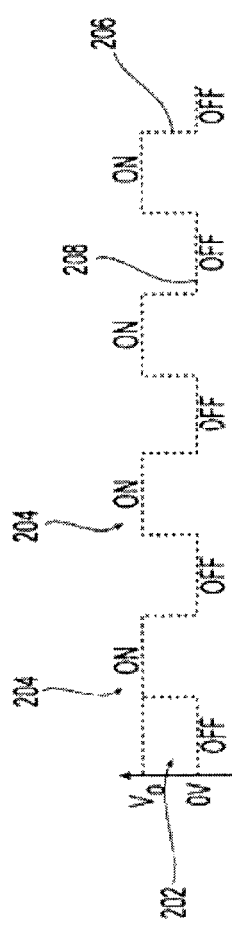
FIG. 7A illustrates an ideal waveform comprising a plurality of light pulses and a plurality of light intervals, in accordance with various embodiments.
Figure 7B:
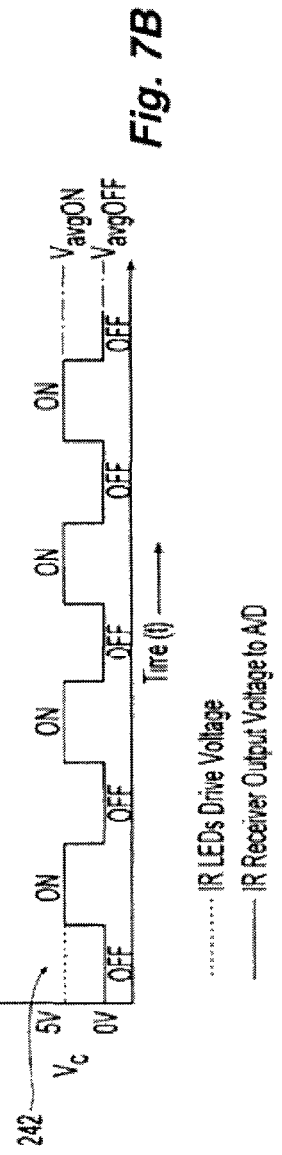
FIG. 7B illustrates an ideal output in response to cargo being positioned on the PDU of FIG. 3, in accordance with various embodiments.

FIG. 7A shows the same ideal output waveform 202 seen in FIG. 6 while FIG. 7B shows, for comparison, an ideal waveform 242 output by the light receiver 58 in response to a stationary object covering the PDU 28. In response to a stationary object such as an ULD covering the PDU 28, the emitted light pulses 240 are reflected off of the bottom surface of that object and the reflected light energy is received at the light receiver 58. The output of light receiver 58 is representative of the time-varying intensity of the reflected light. However, since the object is stationary, ideally, the detector output will track the emitted waveform, with the intensity of detected light on the output side of light receiver 58 being represented by a voltage value Vc.

FIGS. 8A and 88B also correspond to the situation in which an ULD covers the PDU 28, but shows more realistic, non-ideal output. FIG. 8A shows the same ideal output waveform 202 seen in FIGS. 6 and 7. FIG. 8B shows a waveform 260 comprising four pulses of detected light. In this instance, the ULD is initially stationary during the first two pulses 262, 264, and then is in motion during the last two pulses 266, 268.

Figure 8C:
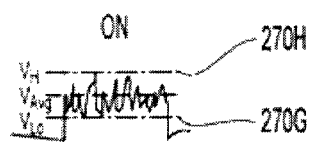
FIG. 8C illustrates a detailed view of a pulse of FIG. 8B representing the stationary cargo, in accordance with various embodiments.

In response to the ULD being stationary, the detected pulses 262, 264 have intensity values that are all confined in a narrow band defined 270 between $V_{LO}$ and $V_{HI}$. This is because the output waveform 202 impinges on the same location on the underside of the ULD, and so the reflected light is substantially unaffected by variations in the surface of the underside of the ULD. FIG. 8C shows a magnified view of the detected pulse 264 and shows that all intensity values within the pulse 264 are between the lower limit 270L and the upper limit 270H of the band.

Figure 8D:
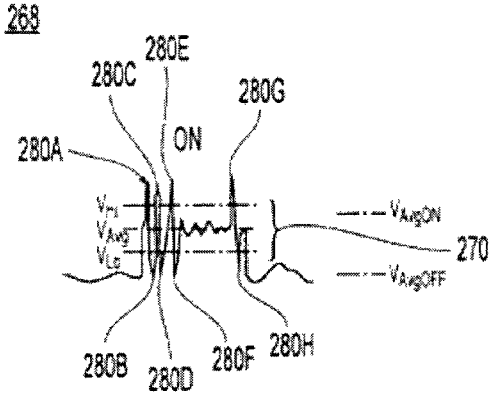
FIG. 8D illustrates a detailed view of a pulse of FIG. 8B representing the moving cargo, in accordance with various embodiments.

In contrast, in response to the ULD being in motion, the detected pulses 266, 268 have intensity values that go outside this band 270 from time to time. This happens because as the ULD moves, different portions of its underside pass over the PDU 28, and variations in the surface of the underside cause corresponding variations the instantaneous intensity of the reflected pulses. Generally speaking, at least a portion of these instantaneous sample values go outside the band 270. FIG. 8D shows a magnified view of the detected pulse 267 and shows that a portion of received intensity values, designated 280A-H are outside the band 270. Digital sample values which fall outside the band 270 are referred to as "spikes".

Certain fluctuations in the environment can affect the light detected by light receiver 58. For example, an underside of a ULD may have a greater reflectivity than other ULDs. This relatively great reflectivity may cause a relative increase in light received by light receiver 58. This relative increase in light may cause light receiver 58 to become saturated such that light receiver 58 may not be capable of distinguishing between samples that are within the band 270 and samples that go outside the band 270. As another example, an operator with a reflective clipboard may walk past PDU 28 in response to no ULD being positioned on PDU 28. Light from light source 57 may reflect off the reflective clipboard and be received by light receiver 58, resulting in a false determination by processor 72 that a ULD is positioned on PDU 28. In that regard, PDU 28 may be designed to adjust an intensity of light generated by light source 57 based on light detected by light receiver 58.

Figure 9:
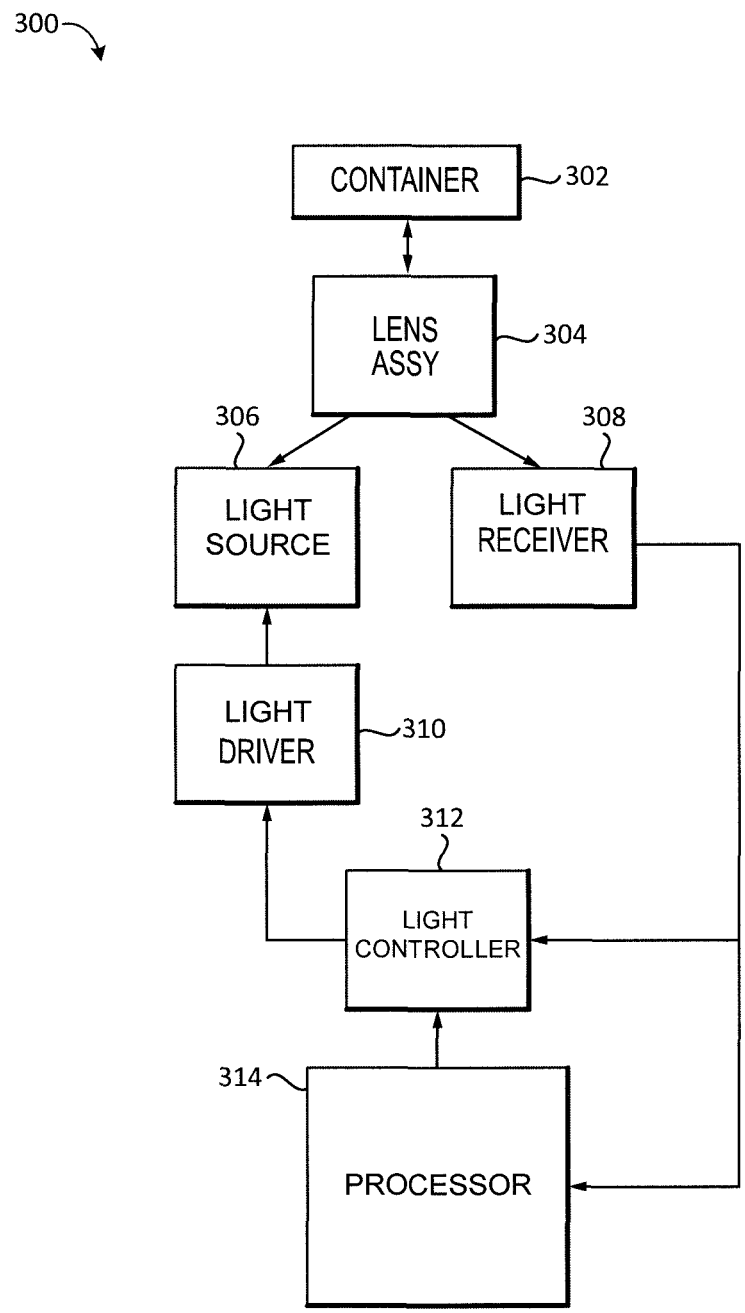
FIG. 9 illustrates a block diagram of a PDU capable of changing an intensity of light output by a light source based on an intensity of a reflection of the light detected by a light receiver, in accordance with various embodiments.

Turning now to FIG. 9, a PDU 300 may include components for automatically adjusting an intensity of light used to detect cargo, such as a ULD, on PDU 300. PDU 300 may have similar features as PDU 28. PDU 300 includes a container, or casing, 302 for supporting and protecting components of PDU 300.

PDU 300 may also include a light source 306 and a light receiver 308. A lens assembly 304 may include one or more lens for light source 306 and one or more lens for light receiver 308. Lens assembly 304 may include a specially crafted lenses designed to increase reliability of detection of the presence and motion of a ULD.

Light source 306 may generate light that is to be directed towards the ULD. The light generated by light source 306 may include a plurality of pulses with a plurality of pulse intervals between the pulses. A pulse interval may correspond to a lack of light generated by light source 306 or an amount of light generated by light source 306 that is less than an amount of light generated during a pulse.

The pulses of light generated by light source 306 may be directed through lens assembly 304 towards a ULD. A light driver 310 may be coupled to light source 306 and control light source 306 to generate the pulses of light. Light driver 310 may determine a desired intensity of the light generated by a light source 306 and may control light source 306 to generate the pulses of light at the desired intensity. PDU 300 is designed such that light driver 310 may cause light source 306 to generate light at various intensities based on data detected by light receiver 308.

Light receiver 308 may receive a reflection of the pulses of light. The pulses of light reflected by the ULD may travel through lens assembly 304 prior to being received by light receiver 308. Light receiver 308 may be adapted to detect an intensity of light in the environment, such as light reflected from the ULD.

The intensity of the light may be transmitted to a light controller 312 and to a processor 314. Processor 314 may determine an average intensity of light detected by light receiver 308 during a pulse and an average intensity of light detected by light receiver 308 during a pulse interval. Processor 314 may determine whether the ULD is positioned on PDU 300 based on a difference between the average intensity of light detected by light receiver 308 during the pulse and the average intensity of light detected by light receiver 308 during the pulse interval. Processor 314 may also determine whether any spikes in light intensity correspond to movement of the ULD.

Light controller 312 may receive the intensity of the light detected by light receiver 308 and may receive a signal from at least one of processor 314 or light driver 310 indicating whether light source 306 is generating a pulse or a pulse interval. In various embodiments, light controller 312 may include additional components for controlling timing of the pulses and pulse intervals and, thus, may already include this information Light controller 312 may use this data to determine an ideal, or desired, intensity of light to be generated by light source 306. Light controller 312 may then provide the desired intensity of light, or a difference between a current intensity of light and the desired intensity of light, to light driver 310. Light driver 310 may cause light source 306 to generate the light pulses at the desired intensity.

Figure 10:
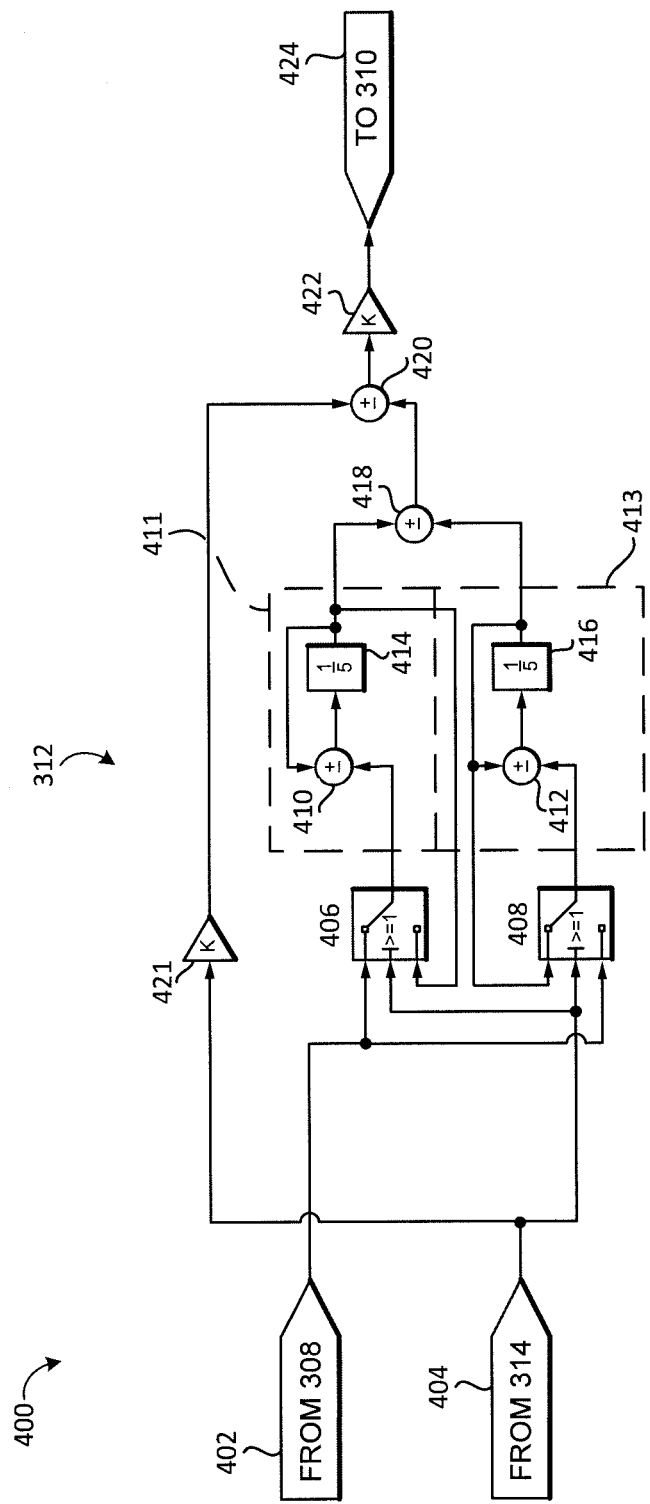
FIG. 10 illustrates features of a light controller of the PDU of FIG. 9, in accordance with various embodiments.

Referring now to FIGS. 9 and 10, a flow diagram 400 illustrates operation of light controller 312. Flow diagram 400 may correspond to a method for determining desired changes to an amount of light generated by light source 306. In various embodiments, some or all components or functions of light controller 312 may be implemented in hardware and, in various embodiments, some or all components or functions of light controller 312 may be implemented in software stored in a non-transitory memory or storage device.

Light controller 312 may receive a first input 402 corresponding to an intensity of light detected by light receiver 308. Light controller 312 may also receive a second input 404 corresponding to an indication of whether light source 306 is generating a pulse or a pulse interval. Light controller 312 may generate an output 424 corresponding to a desired intensity of light to be generated by light source 306 or an adjustment to the desired intensity of light generated by light source 306. Output 424 may be provided to light driver 310 for controlling light source 306.

Light controller 312 may include a first switch 406 and a second switch 408. First switch 406 and second switch 408 may each receive first input 402 and second input 404. First switch 406 may output a current intensity of the reflection of the light detected by light receiver 308 in response to light source 306 generating a pulse of light. First switch 406 may also output an average intensity of the reflection of the light detected by light receiver 308 during a previous pulse in response to light source 306 generating a pulse interval.

Second switch 408 may output an average intensity of the reflection of the light detected by light receiver 308 during a previous pulse interval in response to light source 306 generating a pulse. Second switch 408 may also output a current intensity of the reflection of the light detected by light receiver 308 in response to light source 306 generating a pulse interval. In various embodiments, light source 306 may be said to generate a pulse interval when current is not provided to light source 306 such that no light is provided by light source 306. Thus, first switch 406 outputs a current or a previous average intensity of light detected by light receiver 308 during a current or previous pulse, and second switch 408 outputs a current or a previous average intensity of light detected by light receiver 308 during a current or previous pulse interval.

Light controller 312 further includes a first averaging block 411 and a second averaging block 413. First averaging block 411 determines a running average of light intensity detected by light receiver 308 during any given pulse. Second averaging block 413 determines a running average of light intensity detected by light receiver 308 during any given pulse interval. In that regard and in various embodiments, processor 314 may receive an average light intensity detected by light receiver 308 during a pulse and an average light intensity detected by light receiver 308 during a pulse interval, and may determine whether a ULD is positioned on PDU 300 based on a difference between the average light intensities.

First averaging block 411 may include a first averaging summer 410 and a first integrator 414. During a pulse, first averaging summer 410 may receive a current detected light intensity and a current average light intensity and may output the sum of the current detected light intensity and the current average light intensity. First integrator 414 may determine a new average light intensity of the pulse based on the sum of the current detected light intensity and the current average light intensity. In response to light source 306 switching from a pulse to a pulse interval, first integrator 414 may continue to output the current average light intensity until light source 306 switches from the pulse interval to a new pulse, at which time first integrator 414 may begin to calculate a new average light intensity.

Second averaging block 413 may include a second averaging summer 412 and a second integrator 416. During a pulse interval, second averaging summer 412 may receive a current detected light intensity and a current average light intensity and may output the sum of the current detected light intensity and the current average light intensity. Second integrator 416 may determine a new average light intensity of the pulse interval based on the sum of the current detected light intensity and the current average light intensity. In response to light source 306 switching from a pulse interval to a pulse, second integrator 416 may continue to output the current average light intensity until light source 306 switches from the pulse to a new pulse interval, at which time second integrator 416 may begin to calculate a new average light intensity.

The output of first averaging block 411 and second averaging block 413 is provided to a first summer 418. First summer 418 may determine and output a delta corresponding to a first difference between the output of first averaging block 411 and second averaging block 413. In various embodiments, the delta (the output of first summer 418) is provided to processor 314 such that processor 314 uses the delta to determine whether a ULD is positioned on PDU 300.

Second input 404 is received by a first gain block 421 which multiplies second input 404 by a proportional coefficient. First gain block 421 may output a delta reference corresponding to the results of the multiplication.

The delta reference output by first gain block 421 and the delta output by first summer 418 are received by a second summer 420. Second summer 420 may determine an error signal corresponding to a second difference between the delta reference and the delta.

The error signal may be received by a second gain block 422. Second gain block 422 may multiply the error signal by the proportional coefficient. The result of the multiplication is the output 424 corresponding to the adjustment to the desired intensity of the light.

Figure 11:
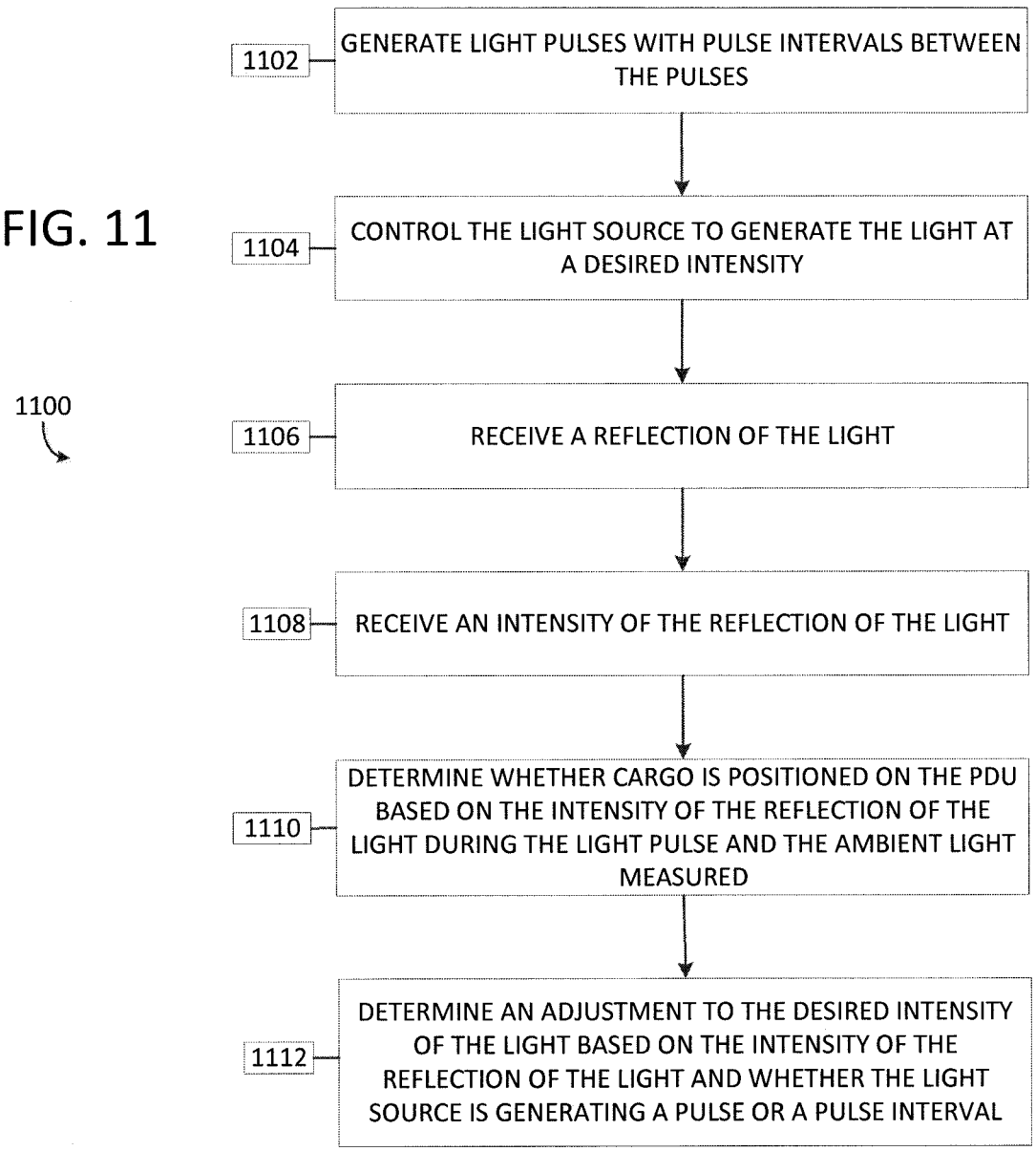
FIG. 11 is a flowchart illustrating a method for determining whether cargo is positioned above a PDU and for controlling a light source to increase an accuracy of the determination, in accordance with various embodiments.

FIG. 11 is a flowchart illustrating a method for determining whether cargo is positioned above a PDU and for controlling a light source to increase an accuracy of the determination. In block 1102, a light source may generate light pulses with pulse intervals between the pulses. Although the light source may be generating no light during a pulse interval, the light source may still be said to generate light pulses and pulse intervals.

In block 1104, a light driver may control the light source to generate the light at a desired intensity. The desired intensity may be determined by a light controller as described below.

In block 1106, a light receiver may receive a reflection of the light. For example, the light may reflect from a piece of cargo and be received by the light receiver.

In block 1108, a processor may receive an intensity of the reflection of the light from the light receiver. In various embodiments, this may include receiving the intensity directly from the light receiver and, in various embodiments, this may include receiving data corresponding to the intensity and determining the intensity by the processor.

In block 1110, the processor may determine whether cargo is positioned on the PDU based on the intensity of the reflection of the light. For example, if relatively little light is received by the light receiver during a pulse as compared to the pulse interval, the processor may determine that no cargo is present on the PDU.

In block 1112, a light controller may determine an adjustment to the desired intensity of the light based on the intensity of the reflection of the light and whether the light source is generating a pulse or a pulse interval. This determination may be made using a light controller similar to the light controller 312 of FIG. 10.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A power drive unit (PDU) for moving cargo within an aircraft, comprising:
   a light source configured to generate light as pulses with pulse intervals between the pulses;
   a light driver configured to control the light source to generate the light at a desired intensity;
   a light receiver configured to receive a reflection of the light;
   a processor coupled to the light receiver and configured to determine whether the cargo is positioned on the PDU based on the reflection of the light; and
   a light controller coupled to the processor and the light driver and configured to determine an adjustment to the desired intensity of the light generated by the light source based on an intensity of the reflection of the light and whether the light source is generating a pulse or a pulse interval.

2. The PDU of claim 1, wherein the light controller includes:
   a first switch configured to output the intensity of the reflection of the light in response to the light source generating the pulse and an average intensity of the reflection of the light detected during a previous pulse in response to the light source generating the pulse interval; and
   a second switch configured to output the average intensity of the reflection of the light detected during a previous pulse interval in response to the light source generating the pulse and the intensity of the reflection of the light in response to the light source generating the pulse interval.

3. The PDU of claim 2, wherein the light controller further includes:
a first averaging block coupled to the first switch and configured to determine the average intensity of the reflection of the light during the pulse or during the previous pulse; and
a second averaging block coupled to the second switch and configured to determine and output the average intensity of the reflection of the light during the pulse interval or during the previous pulse interval.

4. The PDU of claim 3, wherein the light controller further includes a first summer coupled to the first averaging block and the second averaging block and configured to determine a delta corresponding to a first difference between the average intensity of the reflection of the light during the pulse or during the previous pulse and the average intensity of the reflection of the light during the pulse interval or during the previous pulse interval.

5. The PDU of claim 4, wherein the light controller further includes a first gain block configured to determine a delta reference by multiplying the desired intensity of the light generated by the light source by a proportional coefficient.

6. The PDU of claim 5, wherein the light controller further includes a second summer configured to receive the delta reference and the delta and to determine an error signal corresponding to a second difference between the delta reference and the delta.

7. The PDU of claim 6, wherein the light controller further includes a second gain block configured to determine the adjustment to the desired intensity of the light generated by the light source by multiplying the error signal by the proportional coefficient.

8. A cargo loading system for use in an aircraft, comprising:
a cargo deck configured to support cargo; and
a plurality of power drive units (PDUs) each coupled to the cargo deck and having:
a light source configured to generate light as pulses with pulse intervals between the pulses,
a light driver configured to control the light source to generate the light at a desired intensity,
a light receiver configured to receive a reflection of the light,
a processor coupled to the light receiver and configured to determine whether the cargo is positioned on the PDU based on the reflection of the light, and
a light controller coupled to the processor and the light driver and configured to determine an adjustment to the desired intensity of the light generated by the light source based on an intensity of the reflection of the light and whether the light source is generating a pulse or a pulse interval.

9. The cargo loading system of claim 8, wherein the light controller includes:
a first switch configured to output the intensity of the reflection of the light in response to the light source generating the pulse and an average intensity of the reflection of the light detected during a previous pulse in response to the light source generating the pulse interval; and
a second switch configured to output the average intensity of the reflection of the light detected during a previous pulse interval in response to the light source generating the pulse and the intensity of the reflection of the light in response to the light source generating the pulse interval.

10. The cargo loading system of claim 9, wherein the light controller further includes:
a first averaging block coupled to the first switch and configured to determine the average intensity of the reflection of the light during the pulse or during the previous pulse; and
a second averaging block coupled to the second switch and configured to determine the average intensity of the reflection of the light during the pulse interval or during the previous pulse interval.

11. The cargo loading system of claim 10, wherein the light controller further includes a first summer coupled to the first averaging block and the second averaging block and configured to determine a delta corresponding to a first difference between the average intensity of the reflection of the light during the pulse or during the previous pulse and the average intensity of the reflection of the light during the pulse interval or during the previous pulse interval.

12. The cargo loading system of claim 11, wherein the light controller further includes a first gain block configured to determine a delta reference by multiplying the desired intensity of the light generated by the light source by a proportional coefficient.

13. The cargo loading system of claim 12, wherein the light controller further includes a second summer configured to receive the delta reference and the delta and to output an error signal corresponding to a second difference between the delta reference and the delta.

14. The cargo loading system of claim 13, wherein the light controller further includes a second gain block configured to determine the adjustment to the desired intensity of the light generated by the light source by multiplying the error signal by the proportional coefficient.

15. A method for determining desired changes to an amount of light generated by a light source of a power drive unit (PDU), comprising:
generating, by the light source, light as pulses with pulse intervals between the pulses;
controlling, by a light driver, the light source to generate the light at a desired intensity;
receiving, by a light receiver, a reflection of the light;
receiving, by a processor and from the light receiver, an intensity of the reflection of the light;
determining, by the processor, whether cargo is positioned on the PDU based on the intensity of the reflection of the light; and
determining, by a light controller, an adjustment to the desired intensity of the light based on the intensity of the reflection of the light and whether the light source is generating a pulse or a pulse interval.

16. The method of claim 15, further comprising:
outputting, by a first switch of the light controller, the intensity of the reflection of the light in response to the light source generating the pulse;
outputting, by a second switch of the light controller, an average intensity of the reflection of the light detected during a previous pulse interval in response to the light source generating the pulse;
outputting, by the first switch, the average intensity of the reflection of the light detected during a previous pulse in response to the light source generating the pulse interval; and outputting, by the second switch, the intensity of the reflection of the light in response to the light source generating the pulse interval.

17. The method of claim 16, further comprising:
determining, by a first averaging block of the light controller, the average intensity of the reflection of the light during the pulse or during the previous pulse; and
determining, by a second averaging block of the light controller, the average intensity of the reflection of the light during the pulse interval or during the previous pulse interval.

18. The method of claim 17, further comprising determining, by a first summer of the light controller, a delta corresponding to a first difference between the average intensity of the reflection of the light during the pulse or during the previous pulse and the average intensity of the reflection of the light during the pulse interval or during the previous pulse interval.

19. The method of claim 18, further comprising determining, by a first gain block of the light controller, a delta reference by multiplying the desired intensity of the light generated by the light source by a proportional coefficient.

20. The method of claim 19, further comprising:
determining, by a second summer of the light controller, an error signal corresponding to a second difference between the delta reference and the delta; and
determining, by a second gain block of the light controller, the adjustment to the desired intensity of the light generated by the light source by multiplying the error signal by the proportional coefficient.

* * * * *